US006047885A

United States Patent [19]

Fisher

[11] Patent Number: 6,047,885

[45] Date of Patent: Apr. 11, 2000

[54] ACCESS DOOR FOR MATERIALS HANDLING APPARATUS

[75] Inventor: Gregory S. Fisher, Granger, Ind.

[73] Assignee: Robert Bosch Corporation, Broadview, Ill.

[21] Appl. No.: 09/023,883

[22] Filed: Feb. 13, 1998

Related U.S. Application Data

[60] Provisional application No. 60/038,751, Feb. 20, 1997.

[51] Int. Cl.[7] .......... B65G 11/04

[52] U.S. Cl. .......... 232/44; 49/31; 220/200; 220/260

[58] Field of Search .......... 232/44; 49/31, 49/137, 138, 445; 220/200, 211, 260

[56] References Cited

U.S. PATENT DOCUMENTS

| | | | |
|---|---|---|---|
| 3,699,717 | 10/1972 | Hedrick | 49/137 X |
| 3,718,231 | 2/1973 | O'Connor . | |
| 3,880,345 | 4/1975 | Becker et al. | 232/44 |
| 3,921,335 | 11/1975 | Hewitt et al. | 49/138 X |
| 3,936,977 | 2/1976 | Runft et al. . | |
| 3,942,715 | 3/1976 | Anderson | 232/17 |
| 4,552,061 | 11/1985 | Brutsman . | |
| 4,729,490 | 3/1988 | Ziegenbien . | |
| 4,854,076 | 8/1989 | Sieben et al. . | |
| 4,996,467 | 2/1991 | Day | 49/31 X |
| 5,329,212 | 7/1994 | Feigleson . | |
| 5,770,935 | 6/1998 | Smith et al. . | |

*Primary Examiner*—Terry Lee Melius
*Assistant Examiner*—William L. Miller
*Attorney, Agent, or Firm*—Baker & Daniels

[57] ABSTRACT

A materials handling apparatus including a closure door which can be selectively operated to open or close the access opening in the apparatus. The door is operated by means of an air cylinder under the control of an air valve and an electronic control.

13 Claims, 3 Drawing Sheets

ACCESS DOOR FOR MATERIALS HANDLING APPARATUS

This application claims the benefit under Title 35, U.S.C. §119(e) of U.S. Provisional Patent Application Serial No. 60/038,751, entitled ACCESS DOOR FOR MATERIALS HANDLING APPARATUS, filed on Feb. 20, 1997.

BACKGROUND OF THE INVENTION

This invention relates to materials handling equipment and in particular to an access door for a materials handling apparatus.

Materials handling equipment is well known in the art such as, for instance, standardized modules for use with a conveyor line for transporting printed circuit boards whereby the printed circuit boards can be transported to equipment, either automated equipment or equipment operated by operators, for performing operations on the printed circuit boards. Such standardized modules are manufactured by Bosch Automation Products of Buchanan, Michigan and may include modules to:

change the transport direction of printed circuit boards by 90°;

- pick up unpopulated printed circuit boards and to load them onto a conveyor;
- accept populated circuit boards from a process line and to load them into a magazine rack;
- remove populated printed circuit boards from a preloaded magazine rack and then to introduce them into a process line;
- provide first in/first out or last in/first out printed circuit board buffering and compensating for different assembly process times or prolonged delays;
- raise or lower printed circuit boards from one transport level to another;
- invert printed circuit boards to permit operations on the board's reverse surface;
- redirect printed circuit boards to create numerous line layout possibilities:
  - set up an inspection loop;
  - reverse board transport direction;
  - shift the location of the assembly area on the floor; and
  - merge one transport line into another;

In the prior art many of these modules can be connected together and controlled by a central control for a printed circuit board manufacturing line. Alternatively, the need has arisen for independent modules which are designed to work together but with each have their own controls package on board. These modules can communicate with each other but, since they are independent, the manufacturer of these modules cannot control how they will be assembled into a manufacturing line.

These modules include walls with apertures therein through which the printed circuit boards can be transported into the module as well as walls with apertures through which the printed circuit boards, after the module has performed its function, can leave the module.

The need exists to provide access doors for such apertures whereby access to the interior of these modules is prevented while the operations within the module are taking place. Such access doors both prevent unauthorized access by persons to the interior of such modules during the time when operations are performed inside the modules and also prevent contamination of the interior of the modules by dust and the like.

SUMMARY OF THE INVENTION

It is therefore an object of the present invention to provide a materials handling apparatus including ingress and egress openings which can be selectively closed by doors.

It is a further object of the present invention to provide a materials handling apparatus including an access opening which can be selectively closed by means of a door. The door may be selectively operated by means of a closure device, such as for instance an air operated cylinder. Alternatively, the door could be electrically operated. The apparatus includes a control which is responsive to signals provided by sensing means to sense the presence of an object which is ready for ingress into the module. Sensing means may also be provided to indicate that the door is either open or closed. Further, means may be provided to regulate the speed of operation of the door.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE PREFERRED EMBODIMENT

Figure 1:
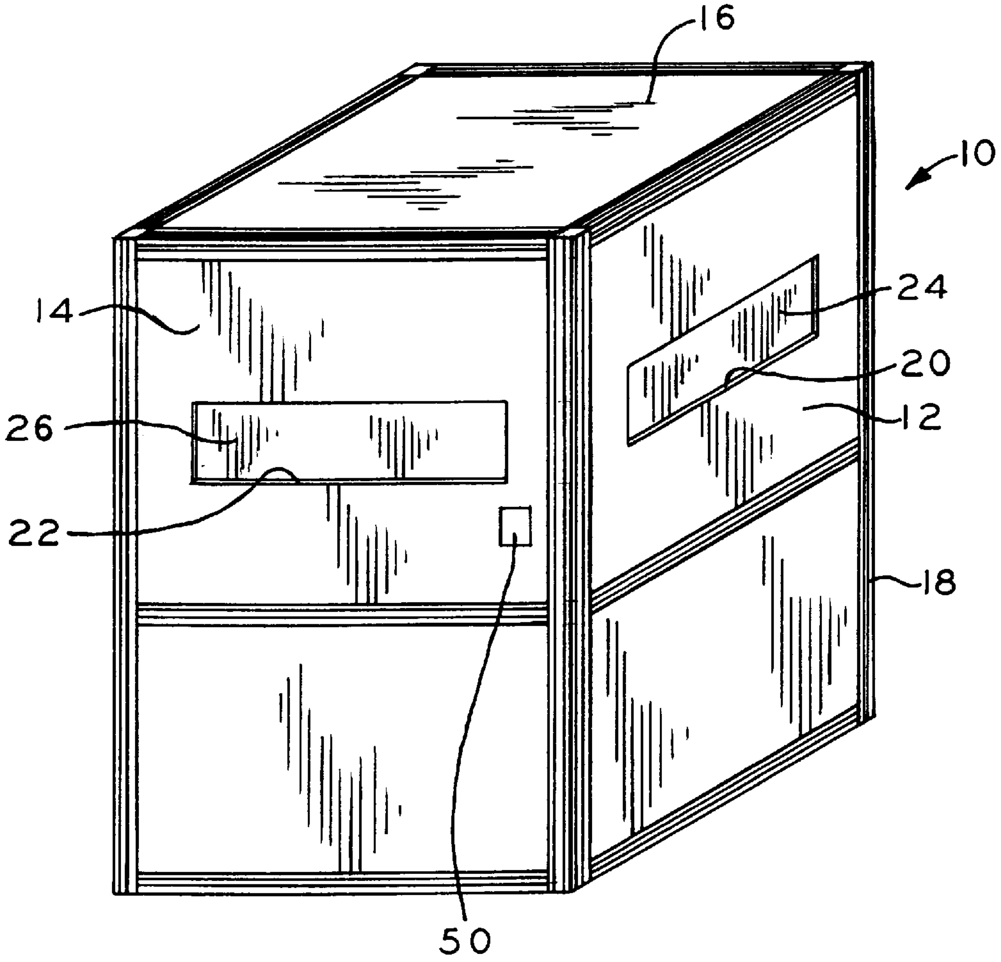
FIG. 1 is a perspective elevational view of a printed circuit board materials handling apparatus.

Referring to FIG. 1 there is shown a materials handling apparatus 10 including a side wall 12, a front wall 14 and a top wall 16. The apparatus is constructed of rails 18 which may be made of aluminum and panels which are supported by the rails to form the walls 12, 14 and 16. Wall 14 includes an aperture 22 and wall 12 includes an aperture 20. These apertures 20 and 22 are provided so that printed circuit boards can enter and leave the apparatus. In use, conveyor lines are positioned whereby the printed circuit boards can enter and leave the apparatus. Such conveyor lines are well know in the art and are sold under the trademark EDGEPRO by Bosch Automation Products of Buchanan, Mich.

Aperture 20 is provided with a door 24 which can close aperture 20. Similarly, aperture 22 is provided with a door 26 for selectively closing aperture 22.

Figure 2A:
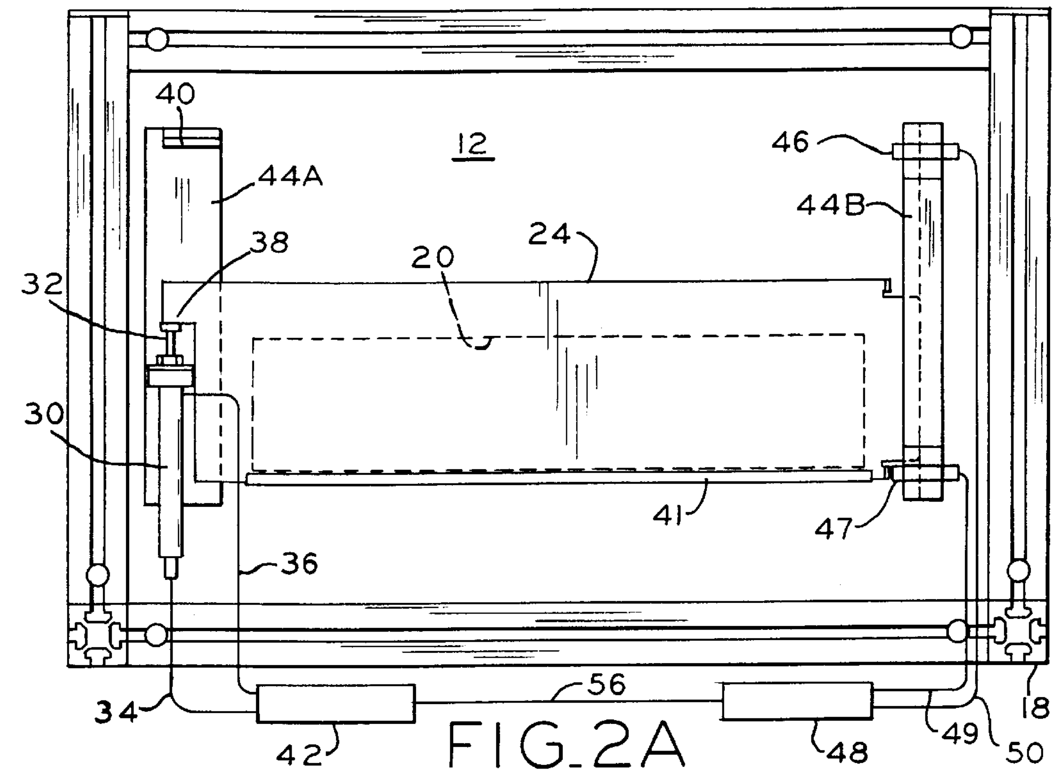
FIG. 2A is a rear elevational view of a wall of the apparatus of FIG. 1 showing the door in the closed position and the operating means therefor.
Figure 2B:
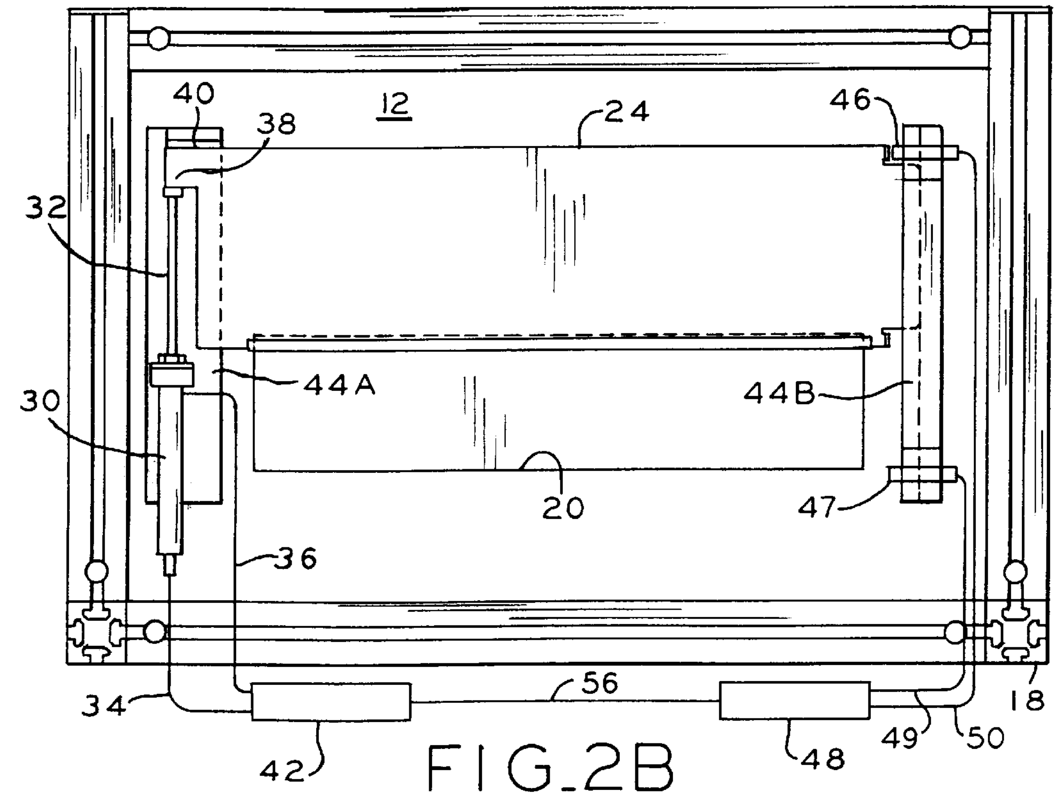
FIG. 2B is a rear elevational view of a wall of the apparatus of FIG. 1 showing the door in the open position.
Figure 3:
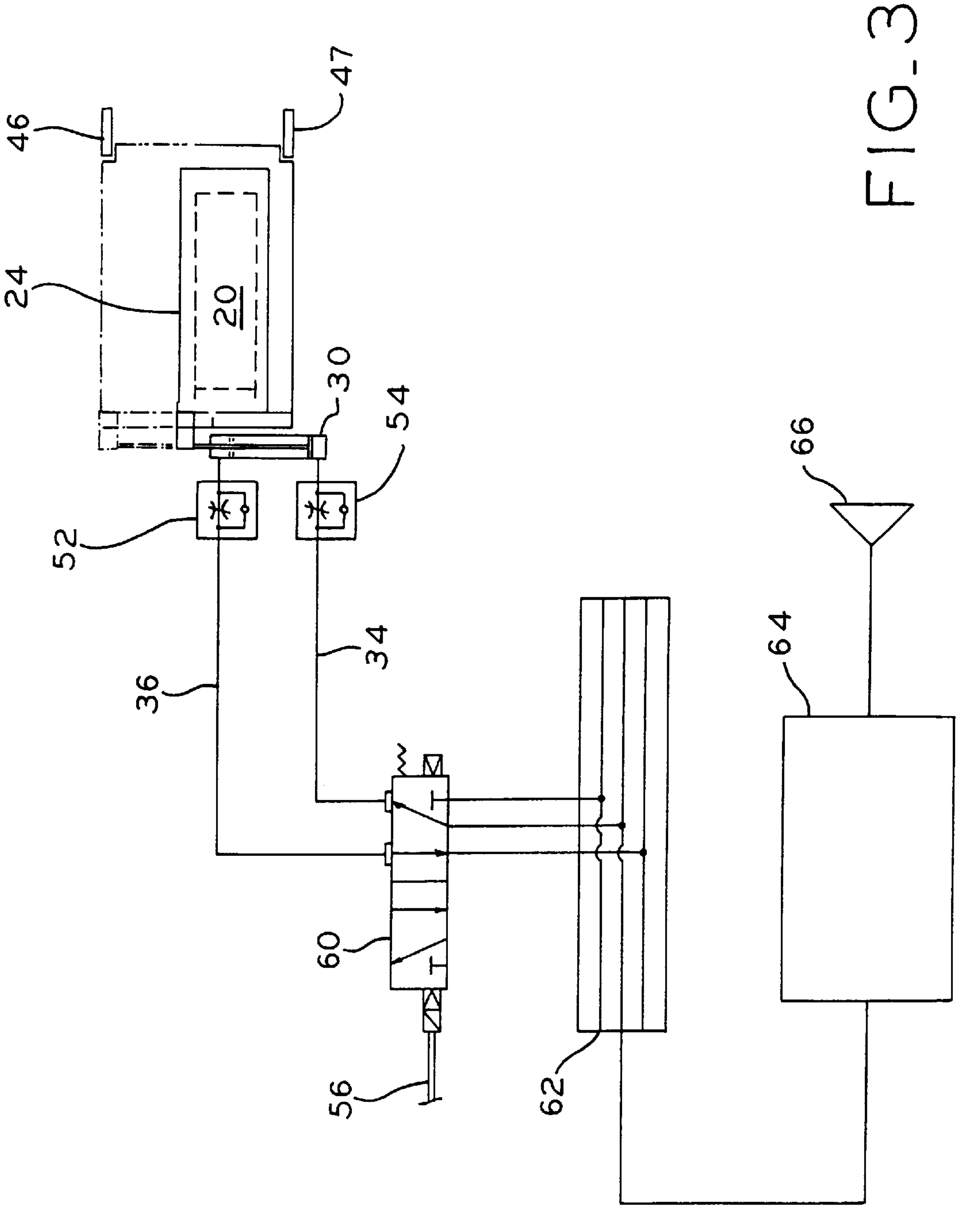
FIG. 3 is a schematic diagram of the control circuit for the door.

As best seen in FIGS. 2 and 3, door 24 is movable from the closed position to an open position shown. Door 24 is larger than opening 20 whereby the door will properly close the opening. Provided on either side of door 24 are guide rails 44A and 44B for guiding the door from its closed to its open position. In order to open door 24, an air cylinder 30 is provided which is connected by air lines 34 and 36 to a control valve 42. Air cylinder 30 includes a piston rod 32 which engages an arm 38 which, in turn, is secured to door 24. When air cylinder 30 is energized, piston rod 32 will extend from air cylinder 30 and thereby force arm 38 upwardly whereby door 20 also moves upwardly, thereby exposing opening 20 and permitting the ingress of a printed circuit board into the apparatus. A rubber pad 40 may be provided to cushion the upward movement of the door 24 and to quiet the operation of the door 24. Proper cushioning can also be provided on the bottom edge of the door by pad 41 to cushion the downward movement of the door. Also provided on the door are sensor switches 46, 47 which change states when the door moves upwardly. The switches are connected to control 48 by conductors 49 and 50. Thus sensor switches 46, 47 indicate whether the door is in the open or closed position. A proximity sensor device 51 is provided on apparatus 10 to sense the proximity of a printed circuit board to the apparatus. Proximity sensor device 51 is connected to control 48 whereby, when the presence of a printed circuit board is sensed, control 48 can cause control valve 42 to operate to thereby cause door 24 to open. Control valve 42 may include a throttle valve to control the speed of operation of air cylinder 30 and thereby cause the speed of operation of the door to be within acceptable limits.

As best seen in FIG. 4, the control valve apparatus 42 includes two flow control valves 52 and 54, a solenoid valve 60, a manifold 62, and an air filter/regulator 64. An air supply 66 supplies air to the filter/regulator. A control signal is fed from control 48 by way of conductor 56 to solenoid valve 60 when it is desired to actuate door 24. Solenoid valve 60 will cause air to flow through line 34, valve 54 into cylinders 30 to actuate the cylinder. Valves 52 and 54 insure that the speed of operation of the door is appropriate.

In operation, when the proximity sensor 51 senses the presence of a printed circuit board at the entry aperture 20 of the apparatus, control 48 causes control valve 42 to operate air cylinder 30, to thereby open door 24. Once the printed circuit board has been transported into the apparatus, air cylinder is deactivated whereby piston rod 32 will retract into air cylinder 30 and door 24 will close by gravity.

Alternatively, other means could be used to open door 24 such as for instance an electromagnetic prime mover.

Similarly, an air cylinder and associated control means are provided for exit door 26. Control 48 controls both doors 24 and 26. Doors 24 and 26 will remain closed until the operation of apparatus 10 on the printed circuit board is complete, at which point doors 26 and 24 will open to permit a new printed circuit board to be transported into the apparatus and the printed circuit board whose operation has been completed can be transported from the apparatus and to the conveyor line.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A materials handling apparatus comprising:

a plurality of walls defining a containment volume;

an opening in one of said walls, said opening adapted to receive a circuit board therethrough;

a door disposed adjacent said opening for closing said opening, said door having respectively a closed position and an open position;

guide rails disposed on either side of said door for guiding said door between said open and closed positions;

a prime mover for moving said door from one of said positions to another of said positions;

a sensor for sensing the presence of an object adjacent said door and for generating a signal in response thereto; and a control connected to said sensor for causing said prime mover to move said door to said open position in response to said signal.

2. The apparatus according to claim 1 wherein said door returns to said closed position from said open position by gravity.

3. The apparatus according to claim 1, wherein said prime mover comprises an air cylinder.

4. The apparatus according to claim 3 wherein said cylinder includes a rod and wherein said door includes an arm, said rod extending out of said cylinder and engaging said arm to move said door to said open position when said air cylinder is activated, said rod retracting into said cylinder when said cylinder is deactivated, whereby said door closes by gravity.

5. The apparatus according to claim 3, including a speed control connected to said cylinder for controlling the speed of said door.

6. The apparatus according to claim 5, wherein said speed control comprises a throttle valve.

7. The apparatus according to claim 1, wherein a second said wall includes a second opening;

a second door disposed adjacent said second opening for closing said second opening and having respectively a closed position and an open position; and a second prime mover for moving said second door from one said position to another said position.

8. The apparatus according to claim 7, including guide rails disposed on either side of said second door for guiding said second door between said open and closed positions.

9. The apparatus according to claim 1, including a switch, said switch operated by said door to sense when said door has been moved to said open position.

10. A materials handling apparatus comprising:

a plurality of walls defining a containment volume;

first and second openings respectively in first and second said walls, said first and second openings each adapted to receive a circuit board therethrough;

first and second doors disposed respectively adjacent said first and second openings for closing said openings, said doors having respectively closed positions and open positions;

guide rails disposed on either side of each of said first and second doors for guiding said first and second doors between said open and closed positions; and a prime mover for moving said doors from one said position to another said position;

a sensor for sensing the presence of an object adjacent said first door and for generating a signal in response thereto; and a control connected to said sensor for causing said prime mover to move said first and second doors to said open position in response to said signal.

11. A materials handling apparatus comprising:

a plurality of walls defining a containment volume;

an opening in one of said walls, said opening adapted to receive a circuit board therethrough;

a door disposed adjacent said opening for closing said opening, said door having respectively a closed position and an open position;

guide rails disposed on either side of said door for guiding said door between said open and closed positions;

an air cylinder for moving said door from said closed position to said open position;

a sensor for sensing the presence of an object adjacent said door and for generating a signal in response thereto; and a control connected to said sensor for causing said air cylinder to move said door to said open position in response to said signal.

12. The apparatus according to claim 11 wherein said door returns to said closed position from said open position by gravity.

13. The apparatus according to claim 11 wherein said cylinder includes a rod and wherein said door includes an arm, said rod extending out of said cylinder and engaging said arm to move said door to said open position when said air cylinder is activated, said rod retracting into said cylinder when said cylinder is deactivated, whereby said door closes by gravity.

* * * * *

UNITED STATES PATENT AND TRADEMARK OFFICE

CERTIFICATE OF CORRECTION

PATENT NO. : 6,047,885

DATED : April 11, 2000

INVENTOR(S) : GREGORY S. FISHER

It is certified that error appears in the above-identified patent and that said Letters Patent are hereby corrected as shown below:

In Column 3, Line 33, insert - -device- - after "sensor" and before "51"

Title Page, change reference numeral "50" to "51" on the drawing

On Sheet 1 of 3 of the drawings, Figure 1, change reference number "50" to "51"

Signed and Sealed this

Third Day of April, 2001

*Attest:*

Nicholas P. Godici

NICHOLAS P. GODICI

*Attesting Officer*

*Acting Director of the United States Patent and Trademark Office*